Nov. 10, 1931.  T. SONSTENESS  1,831,203
AEROPLANE
Filed June 24, 1930   6 Sheets-Sheet 3
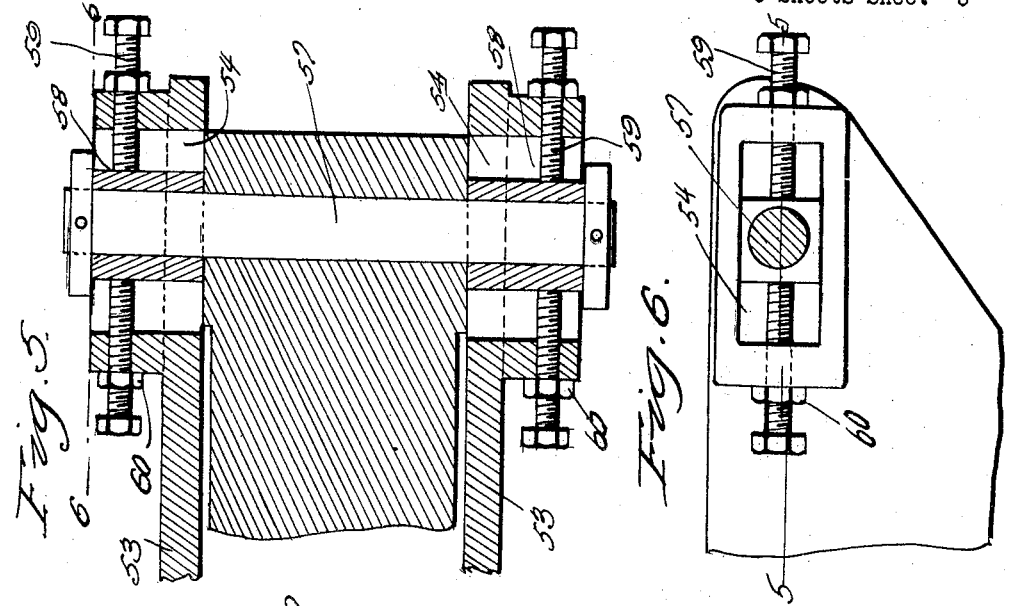
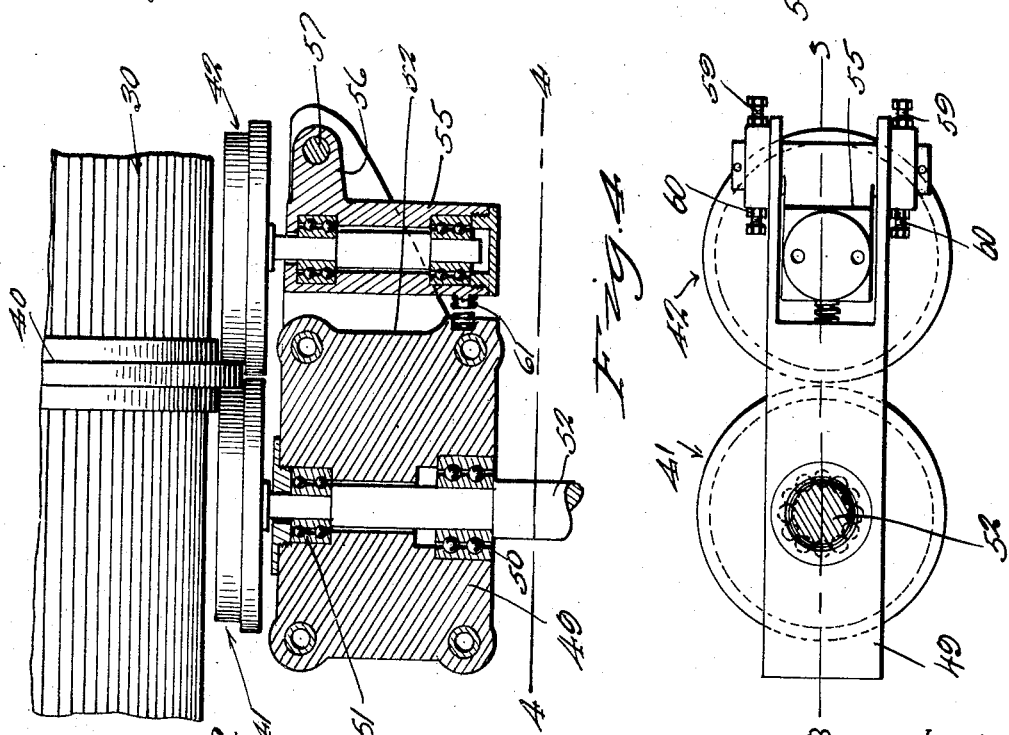
Inventor
*Thorne Sonsteness*
By *Clarence A. O'Brien*
Attorney

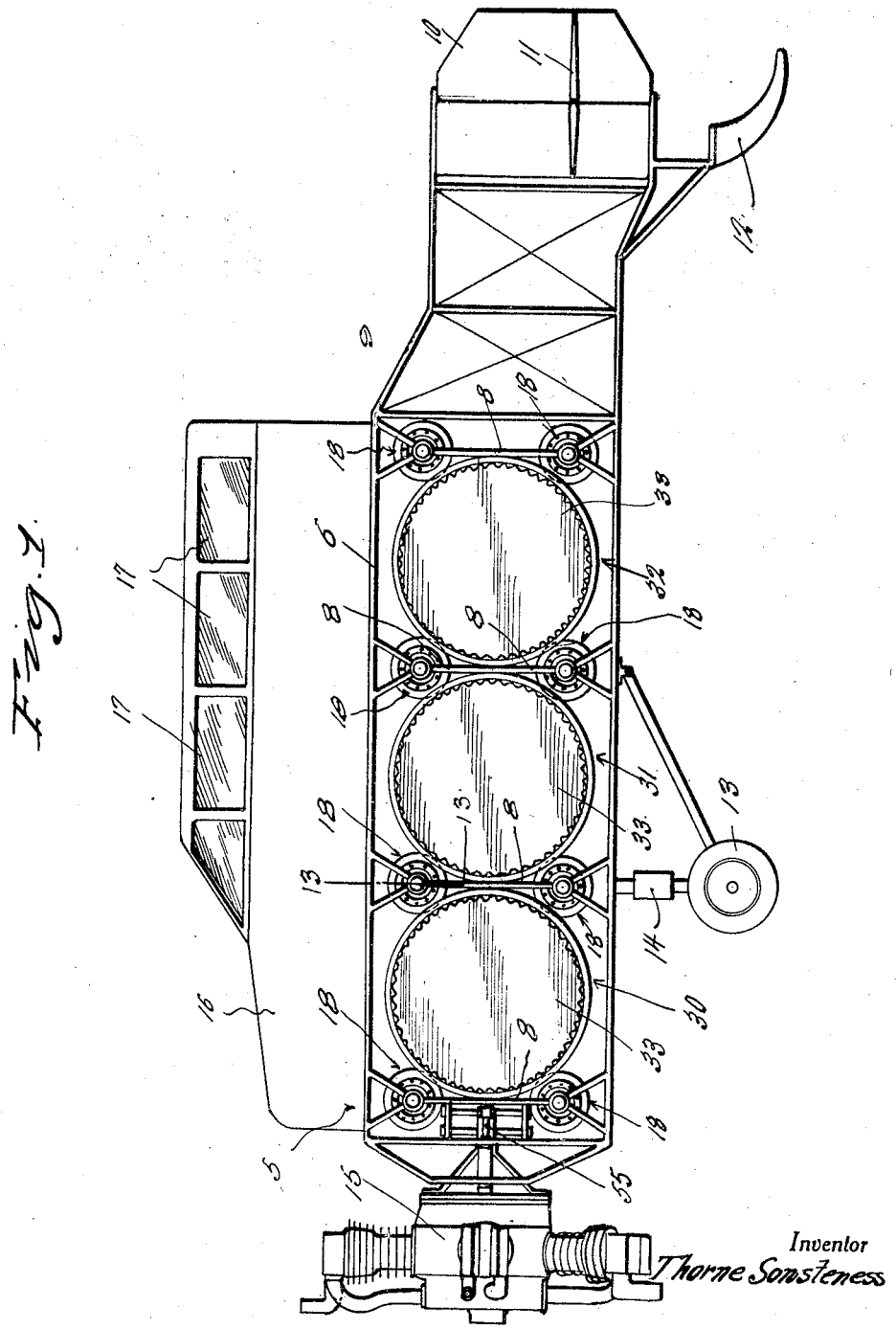

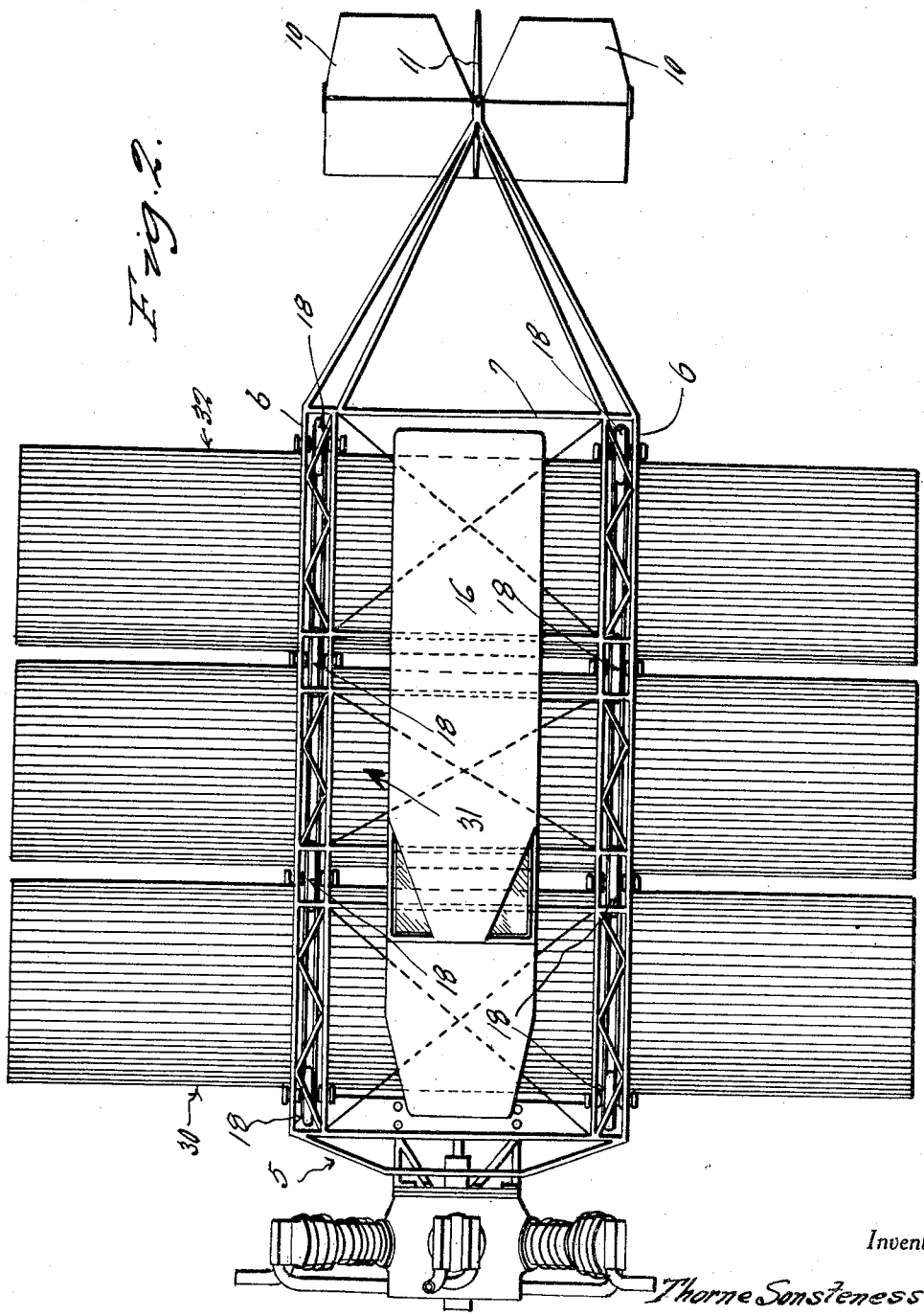

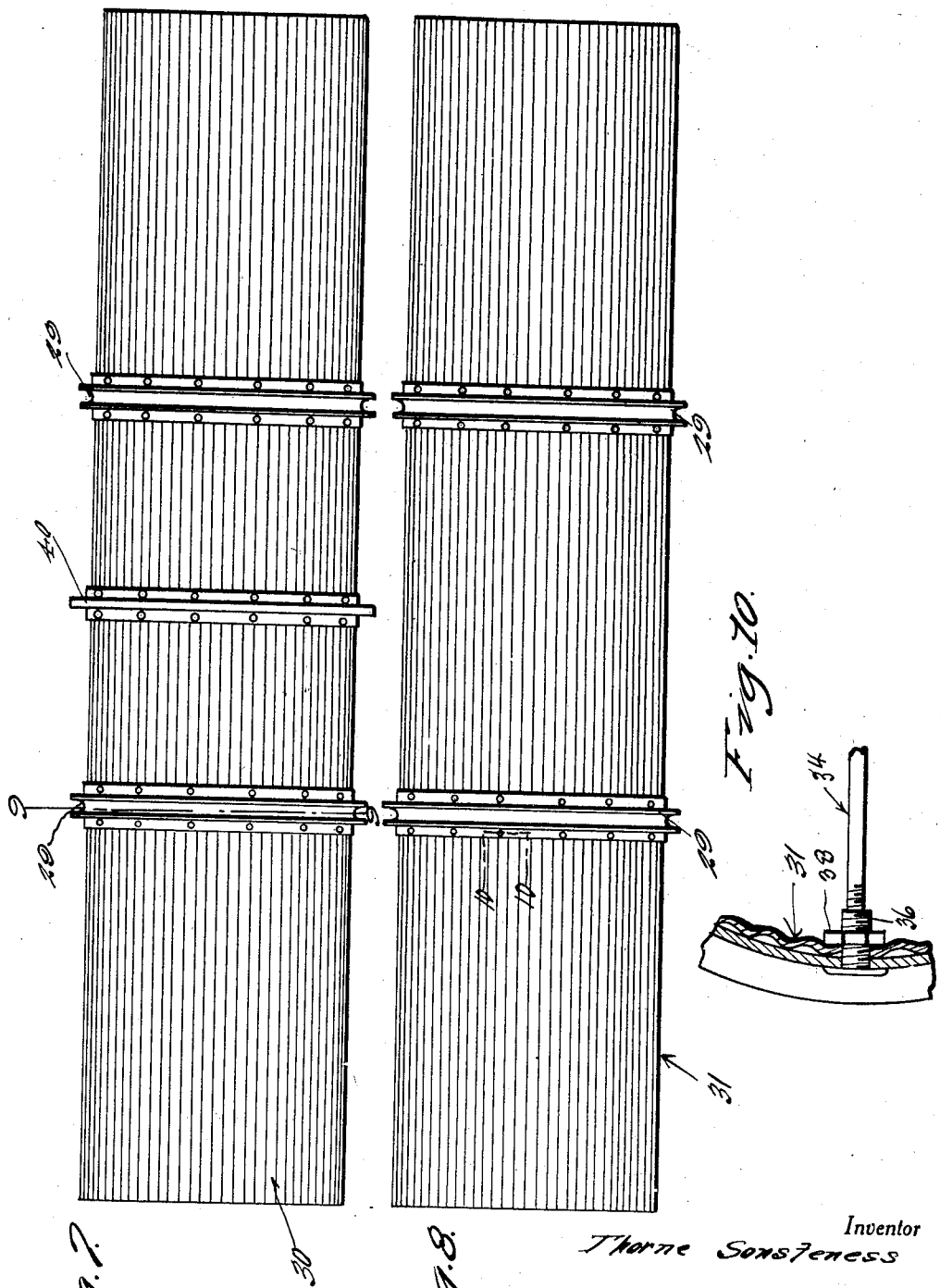

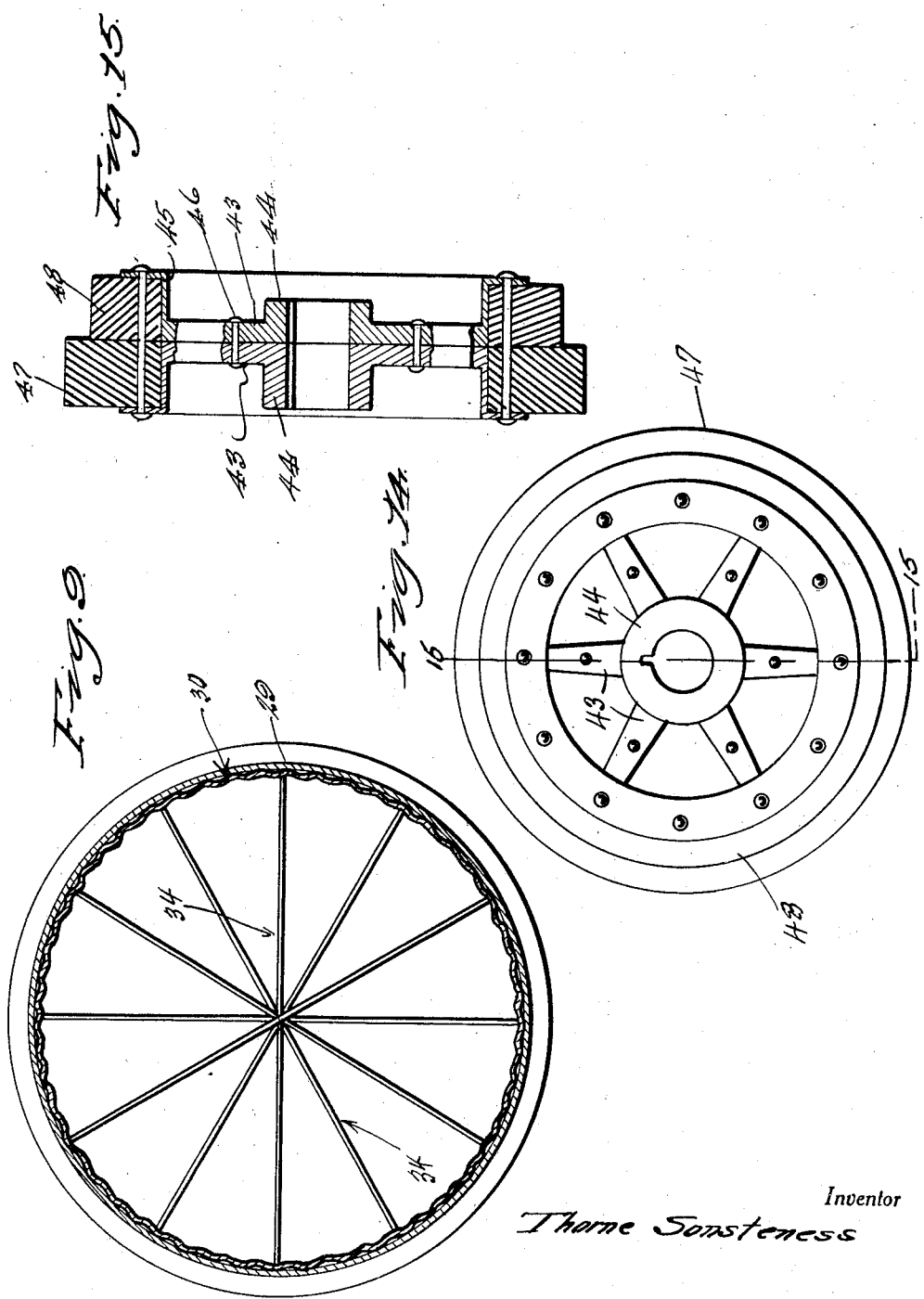

Nov. 10, 1931.　　　T. SONSTENESS　　　1,831,203
AEROPLANE
Filed June 24, 1930　　6 Sheets-Sheet 6
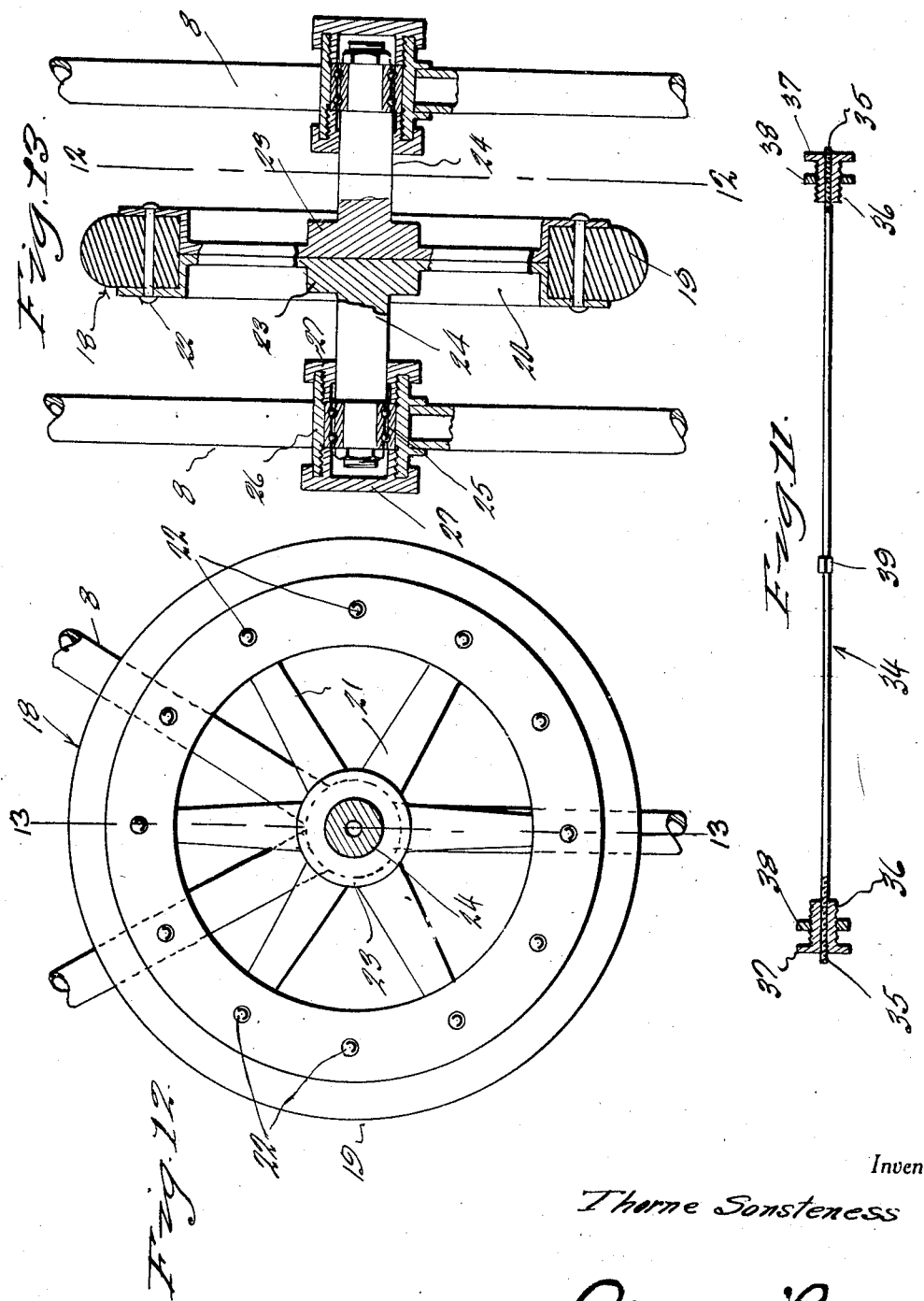
Inventor
*Thorne Sonsteness*
By *Clarence A. O'Brien*
　　　Attorney Patented Nov. 10, 1931

1,831,203

UNITED STATES PATENT OFFICE

THORNE SONSTENESS, OF PONTIAC, MICHIGAN

AEROPLANE

Application filed June 24, 1930. Serial No. 463,447.

This invention appertains to new and useful improvements in the art generally known as aeronautics, and more particularly to an aeroplane which employs rotating cylinders as a substitute for wings.

The principal object of this invention is to provide an aeroplane of the character stated which will greatly reduce the hazard of damage and personal injury occasioned by the stopping of the motor while in flight.

Another important object of the invention is to provide an aeroplane provided with means whereby landing speed may be reduced materially.

These and various other important objects and advantages of the invention will readily become apparent to the reader as the invention is better understood from the following specification and claims.

In the drawings:—

Figure 1 represents a side elevational view of the novel ship.

Fig. 2 represents a top plan view of the aeroplane.

Fig. 3 represents a fragmentary detail sectional view disclosing the drive means for the rotors.

Fig. 4 represents a horizontal sectional view taken substantially on the line 4—4 of Fig. 3, looking in the direction of the arrows.

Fig. 5 is a fragmentary sectional view taken substantially on the line 5—5 of Fig. 6.

Fig. 6 is a sectional view taken substantially on the line 6—6 of Fig. 5.

Fig. 7 is a top plan view of the forward rotor.

Fig. 8 represents a top plan view of the intermediate or rearward rotor, each of which is constructed indentically.

Fig. 9 represents a cross sectional view taken substantially on the line 9—9 of Fig. 7.

Fig. 10 represents a fragmentary enlarged sectional view taken substantially on the line 10—10 of Fig. 8.

Fig. 11 represents an elevational view in part section, disclosing one of the internal struts for the rotors.

Fig. 12 represents a sectional view taken substantially on the line 12—12 of Fig. 13.

Fig. 13 represents a fragmentary sectional view taken substantially on the line 13—13 of Fig. 12.

Fig. 14 represents a side elevational view of one of the drive wheels shown in Fig. 3.

Fig. 15 represents a diagonal sectional view taken substantially on the line 15—15 of Fig. 14.

Referring to the drawings wherein like numerals designate like parts, it can be seen that the invention includes a frame generally referred to by numeral 5 the same including the side structures 6—6, (see Fig. 2) and the connecting bars 7. The side frames 6 include vertically disposed brace bars 8. A tail frame 9 converges in construction toward its rear end and supports the elevators 10 and rudder 11 as well as carrying the tail skid 12.

The frame generally referred to by numeral 5 is supported by the wheels 13, and as is clearly shown in Fig. 1, suitable shock absorbing means 14 may be interposed between the axle of the wheel 13 and the frame 5. It can be seen in both Figs. 1 and 2, that the motor 15 which can be radial or otherwise, is supported at the forward end of the frame 5.

Furthermore, the cabin 16 is mounted upon the cross bar 7, of the frame 5, and is provided with a suitable number of windows 17. It will also be observed that this cabinet is built along stream lines so as to offer as least resistance to the atmosphere as possible.

As is clearly shown in Fig. 13, the bars 8 of each side frame structure 6 are arranged in closely spaced pairs and as shown, a bearing wheel generally referred to by numeral 18 is mounted between the bars 8 of each pair. Each of these wheels includes the annular tire 19 and a mount therefor. This mount is made up of a pair of disks 20 indented and cut to provide spokes 21, the edge portions of which are disposed outwardly, so that when the disks are disposed together, a panel is provided for reception of the tire 19.

Suitable pins or rivets 22 are disposed through the tire to connect the edge portions of the disks 20 in clamping engagement with the tire. The central portions of the disks 20 are thickened as at 23 and have pintles 24 projecting therefrom to terminate within the bearings 25 on the bars 8. Each of these bearings includes an internally threaded barrel 26 provided with a cap 27 engageable into each end thereof for engaging the bearing 25 to definitely center the same within the barrel and also to permit adjustment of the bearing.

As is clearly shown in Fig. 1, these bearing wheels 18 are mounted in such a manner as to engage in the channeled tracks 29, which are circumferentially disposed on the rotors generally referred to by numerals 30, 31 and 32. These rotors are constructed of preferably corrugated metal, the same being cylindrical and hollow throughout their length.

An end wall 33 is provided at each end of each of the rotors and as is clearly shown in Fig. 9, struts generally referred to by numeral 34 are arranged within the rotors to reinforce the same. Each of these struts is constructed in the manner shown in Fig. 11, each of which has its opposite end threaded as at 35 for disposition into the threaded bushing 36, the bushings 36 being provided with heads 37 for engaging the outer side of the rotor to prevent slipping through of the bushing into the rotor.

Jamb nuts 38 are engaged on the bushings 36 as in the manner clearly shown in Fig. 10 to retain the bushings against displacement. The intermediate portion of each strut 34 has a polygonal-shaped enlargement 39 thereon with which a wrench may be engaged for properly tightening and adjusting the struts within the rotor.

The forward rotor 30 has an annular flange 40 at an intermediate point thereon and this flange is disposed circumferentially of the rotor for disposition between the drive wheel generally referred to by numeral 41 and the bearing wheel, generally referred to by numeral 42. Each of these two wheels is constructed as shown in Fig. 15 and very similar in construction to the bearing wheel disclosed in Fig. 13. The wheel disclosed in Fig. 15 which is identical in construction with the wheels 41 and 42 consists of a pair of plates 43—43 each constructed at its center portion to provide a hub 44 and at its edge portion, offset as at 45 so that when the disks are brought together and secured by rivets 46, a grooveway will be provided for the reception of the tires 47 and 48, the former being substantially greater in diameter than the latter.

Obviously, in operation, (see Fig. 3), the inner side of the tire 47 will engage the periphery of the flange 40 on the forward rotor 30 while the peripheries of the tires 48 will ride against the sides of the flange 40.

Still referring to Fig. 3, it can be seen that the casting 49 has the ball bearing mounts 50 and 51 therein through which the shaft 52 is disposed for supporting the drive wheel 41 at its upper end. The casting 49 at one end is bifurcated as at 52′ and the furcations 53—53 are provided with longitudinally tending slots 54 at their outer ends. A cylinder 55 has its upper end disposed between the furcations 53—53 and from the upper end of the cylinder 55 the shoulder 56 projects laterally. This shoulder 56 has a bore therethrough to receive the pin 57, the ends of which project beyond the opposite ends of the shoulder 56 and into the sleeves 58—58. These sleeves 58—58 are slidable in the slots 54 and are movable by the adjusting screws 59 to any set adjusted position, each of the adjusting screws being provided with a jamb nut 60.

The spring 61 is interposed between the lower end of the cylinder 55 and the adjacent portion 49 for normally urging the lower end of the cylinder outwardly so as to swing the wheels 42 on its fulcrum to a position snugly engaging the flange 40.

It can now be seen that when the engine of the aeroplane is in operation and the propeller is rotating, air will be driven rearwardly against the corrugated rotor. Simultaneously, the rotors will be moving all in the same direction. This will result in the building up of air pressure behind each of the rotors and the reduction of pressure against the rotor from the front.

In other words, the rearwardly driven wind from the propeller will be diverted beneath the rotors and some of this by-passed pressure will also be swept behind the rotors to build up pressure behind the same, for urging the plane forwardly.

While the foregoing specification sets forth the invention in specific terms, it is to be understood that numerous changes in the shape, size, and materials may be resorted to without departing from the spirit and scope of the invention as claimed hereinafter.

Having thus described my invention, what I claim as new is:—

1. In an aeroplane of the character described including a fuselage and propelling means; a plurality of horizontally disposed parallel rotors mounted on the fuselage in driving connection between the propelling means and one of the rotors and frictional drive wheels interposed between the said rotors whereby all of the rotors will be driven in the same direction.

2. In an aeroplane of the class described, an open work frame, a plurality of horizontal cylinders passing through the frame, a plurality of friction wheels supported in the frame, tracks on the cylinders adjacent the wheels whereby the cylinders are supported by the wheels and the wheels act to transmit motion of one cylinder to another, propelling means, and means for rotating one of the cylinders from said propelling means.

3. In an aeroplane of the class described comprising a frame, a plurality of horizontal cylinders passing through the frame, a plurality of friction wheels rotatably supported in the frame, tracks on the cylinders engaged by the wheels whereby the cylinders are supported by the wheels and the motion of one cylinder is transmitted to another cylinder by said wheels, propelling means including a shaft, a flange on the forward cylinder, a pair of friction wheels engaging the flange, and means for rotating one of the friction wheels last mentioned from said shaft.

4. In an aeroplane of the class described an openwork frame, cylinders passing through the frame, said cylinders being corrugated longitudinally, a plurality of friction wheels rotatably supported in the frame, tracks on the cylinders engaged by the wheels, propelling means for the plane, means for rotating the forward cylinder from said propelling means, and a cabin supported on the upper part of the frame.

In testimony whereof I affix my signature.

THORNE SONSTENESS.